(No Model.)
H. G. TARNKE.
CANVAS STRETCHER.
No. 587,882. Patented Aug. 10, 1897.
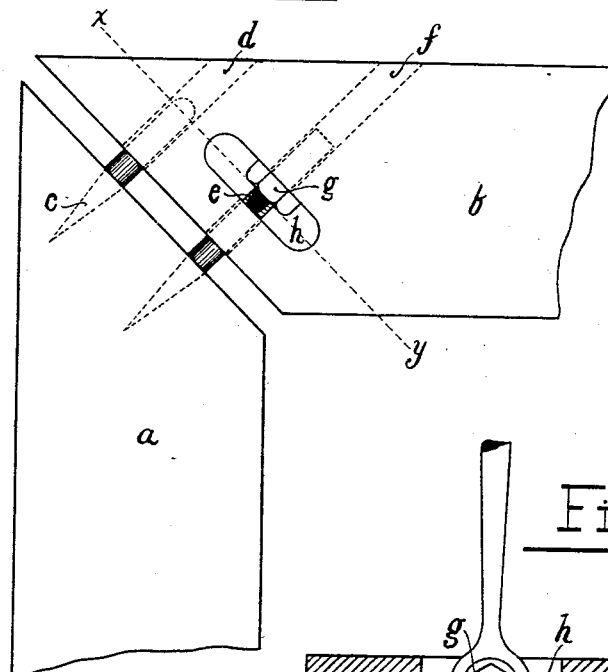
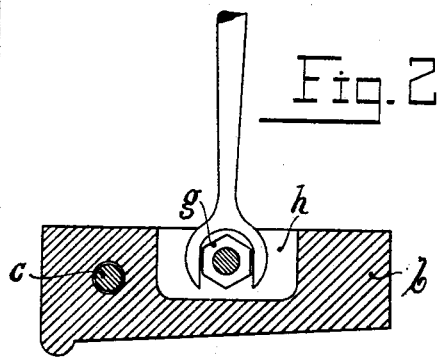
WITNESSES:
Harry Pagle.
Maggie Oltsch.
INVENTOR
H. G. Tarnke
BY George Oltsch.
ATTORNEY.

UNITED STATES PATENT OFFICE.

HELMUTH G. TARNKE, OF HAMBURG, GERMANY.

CANVAS-STRETCHER.

SPECIFICATION forming part of Letters Patent No. 587,882, dated August 10, 1897.

Application filed May 9, 1896. Serial No. 590,962. (No model.)

*To all whom it may concern:*

Be it known that I, HELMUTH GUSTAV TARNKE, a subject of the Emperor of Germany, and a resident of Hamburg, Germany, have invented certain new and useful Improvements in Canvas-Stretchers, of which the following is a specification.

My invention relates to improvements in frames to which canvas is attached and as commonly used by artists for oil and other paintings, and has for its object the providence of better and more secure means of stretching the canvas after being fastened to the frame in lieu of the common method of driving wedges into the corners of the frame, to expand the same in order to obtain the same results, which in practice has been found unsatisfactory.

In the accompanying drawings, Figure 1 is a back view of the corner of a frame, showing my improvement, the remaining three corners of a complete frame being similar in construction. Fig. 2 is a sectional view on a line $x\ y$ of Fig. 1.

In the drawings similar letters of reference indicate like parts in both views thereof.

$a$ and $b$ are the sides of a frame, mitered at their adjoining ends. One end of each side piece is provided with a boring $d$ for the reception of a dowel-pin $c$ in the adjoining frame-piece. The dowel $c$ in connection with the boring $d$, into which the same projects when the frame-pieces are in position, acts as a guide and retains the same at the correct angle to each other when expanded or contracted by means hereinafter described.

$e$ is a threaded bolt pointed on one end and driven into the same end of the frame-piece as the dowel and on an angle with the same. This bolt passes into a boring $f$ of the adjoining frame-piece, and like the dowel $c$ also acts as a guide. On the back side of the frame-piece and at a right angle to the boring $f$ a recess $h$ is provided to allow a nut $g$, carried by the bolt $e$, to be freely turned by a wrench or other suitable means. By turning the nut to the left the same will butt against the side of the recess, as shown in Fig. 1, and cause the frame-pieces to separate, and vice versa, by turning the nut in the opposite direction.

In practice each corner of a frame is constructed as shown and described, and the canvas is secured to the frame by nails, tacks, or other suitable means, after which the canvas can be readily and easily stretched to the desired tension.

I am aware of the fact that it is not new to provide a frame, as described, with dowels on the corners to act as guides or to expand the frame by means of screws; but

What I claim is—

The combination of the mitered frame-pieces having a fixed dowel and threaded bolt on one corner, borings directly opposite the same for the reception of said dowel and bolt, and an adjusting-nut upon the bolt within a recess formed near the corner of the frame for the purpose substantially as described.

H. G. TARNKE.

Witnesses:
 E. GOLDSCHMIDT,
 E. LANGE.